US011643363B2

United States Patent
Würmli et al.

(10) Patent No.: US 11,643,363 B2
(45) Date of Patent: May 9, 2023

(54) SINGLE COMPONENT EPOXY RESIN CEMENT MORTAR

(71) Applicant: SIKA TECHNOLOGY AG, Baar (CH)

(72) Inventors: Fabio Würmli, Wädenswil (CH); Thomas Moser, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 444 days.

(21) Appl. No.: 16/618,492

(22) PCT Filed: May 31, 2018

(86) PCT No.: PCT/EP2018/064367
§ 371 (c)(1),
(2) Date: Dec. 2, 2019

(87) PCT Pub. No.: WO2018/220133
PCT Pub. Date: Dec. 6, 2018

(65) Prior Publication Data
US 2020/0123056 A1    Apr. 23, 2020

(30) Foreign Application Priority Data

May 31, 2017 (EP) .................... 17173667

(51) Int. Cl.
| | | |
|---|---|---|
| *C04B 24/28* | (2006.01) | |
| *C04B 14/06* | (2006.01) | |
| *C04B 14/10* | (2006.01) | |
| *C04B 14/18* | (2006.01) | |
| *C04B 14/20* | (2006.01) | |
| *C04B 24/12* | (2006.01) | |
| *C04B 24/26* | (2006.01) | |
| *C04B 28/04* | (2006.01) | |
| *C04B 40/06* | (2006.01) | |

(52) U.S. Cl.
CPC ............ *C04B 24/281* (2013.01); *C04B 14/06* (2013.01); *C04B 14/10* (2013.01); *C04B 14/18* (2013.01); *C04B 14/202* (2013.01); *C04B 24/121* (2013.01); *C04B 24/2641* (2013.01); *C04B 24/2676* (2013.01); *C04B 28/04* (2013.01); *C04B 40/0608* (2013.01)

(58) Field of Classification Search
CPC .. C04B 24/281; C04B 24/121; C04B 24/2641
See application file for complete search history.

(56) References Cited

U.S. PATENT DOCUMENTS

| | | | |
|---|---|---|---|
| 5,252,636 A | 10/1993 | Ellenberger et al. | |
| 5,753,036 A * | 5/1998 | Hornaman | .......... C04B 24/2641 106/810 |
| 2011/0160350 A1 | 6/2011 | Bergman et al. | |
| 2011/0166259 A1* | 7/2011 | Butikofer | ........... C08G 59/4042 523/401 |
| 2012/0329908 A1* | 12/2012 | Chen | ................... C04B 40/0042 523/401 |
| 2016/0152522 A1 | 6/2016 | Wurmli et al. | |

FOREIGN PATENT DOCUMENTS

| | | |
|---|---|---|
| DE | 3 308 622 A1 | 9/1984 |
| DE | 10 2010 039 315 A1 | 2/2012 |
| EP | 0 409 787 A1 | 1/1991 |
| EP | 0 786 439 A1 | 7/1997 |
| EP | 2 537 896 A1 | 12/2012 |
| EP | 2 537 897 A1 | 12/2012 |
| EP | 2288640 B1 | 9/2018 |
| GN | 102300940 A | 12/2011 |
| WO | 87/05833 A1 | 10/1987 |
| WO | 93/16010 A1 | 8/1993 |
| WO | 2010/107539 A1 | 9/2010 |
| WO | WO-2010086217 A3 * | 12/2010 ........... C09D 133/14 |
| WO | 2014/079854 A1 | 5/2014 |
| WO | 2015/049229 A1 | 4/2015 |

OTHER PUBLICATIONS

Machine translation of WO 2010/086217 (Year: 2010).*
Summary of Jul. 23, 2021 Third Party Opposition issued in Thailand Patent Application No. 1901006770.
Aug. 22, 2018 Search Report issued in International Patent Application No. PCT/EP2018/064367.
Dec. 3, 2019 International Preliminary Reporton Patentability issued in PCT/EP2018/064367.

* cited by examiner

*Primary Examiner* — Megan McCulley
(74) *Attorney, Agent, or Firm* — Oliff PLC

(57) ABSTRACT

A composition including cement, filler, polymer and a compound having epoxide groups and also an amine, wherein the composition contains more than 10% by weight of cement and at room temperature is present as storage-stable free-flowing powder and/or granular material. When mixed with water, the composition makes polymer-modified mortars having good processability, excellent adhesion, strength, water impermeability, chemical resistance and quick coatability possible.

8 Claims, No Drawings

SINGLE COMPONENT EPOXY RESIN CEMENT MORTAR

TECHNICAL FIELD

The invention relates to one-component polymer-modified compositions containing cement, the production of such compositions and the use thereof as mortar, screed, coating or corrosion protection.

PRIOR ART

Polymer-modified mortars are known in the building sector. DE 10 2010 039 315 describes a water-redispersible polymer powder containing film-forming base polymers, additives and protective colloids for improving the storage stability of the cement or cement-based dry mortars. Mortars or concrete modified with epoxy resin are likewise known. These are typically three-component products comprising a liquid component which contains an epoxy resin emulsified in water, a further liquid component which contains a water-dilutable hardener for the epoxy resin and a solid component which contains cement and aggregates. The three components are stored in separate containers and mixed with one another only during processing, whereupon the curing reactions of the cement and of the epoxy resin proceed in parallel. Such compositions modified with epoxy resin allow very good adhesion to a moist substrate, a good water retention capability and a high water impermeability.

US 2016/152522 describes a multicomponent composition comprising a binder component comprising an epoxy resin, a hardener component comprising an amine hardener and a solid component comprising a hydraulic binder.

However, the fact that such a system has three components is accompanied by disadvantages. The handling of three components is complicated and subject to mistakes for the processor and on the building site results in a large amount of waste since the liquid components are stored in water-resistant and strong containers, for example plastic bottles or canisters.

There have already been attempts to reduce the number of components in mortars modified with epoxy resin.

EP 0 409 787 describes a cement-containing dry mixture which contains epoxy resin and hardener, with the epoxy resin and the hardener each having been applied separately to a fine support material. However, the mixtures described do not have satisfactory storage stability, in particular at relatively high temperatures.

EP 0 786 439 describes polymer-modified ready-to-use mixtures in the case of which two mixing components are mixed: one contains the epoxy resin, cement and a latent hydraulic binder, while the other contains the amine hardener. The ready-to-use mixtures containing both mixing components have poor storage stability and display an undesirably slow strength development after mixing with water.

EP 0 580 588 describes a dry cement mortar containing cement, aggregates, reactive resin and hardener. The hardener is added to the mortar in the form of a reaction product with an organic acid or a functional derivative thereof. DE 3308622 discloses a process for a reactive resin-hardener preparation in which resin and hardener are sprayed separately and a dust-like material is applied to the surface of the droplets. In a further process described in DE 3308622, resin and hardener are reacted as liquid mixture and an organic acid is added before hardening is complete in order to block the remaining free reactive groups of the hardener. WO 2010/086217 describes a polymer powder composition containing an epoxy resin. The preferred use is in cement-free or low-cement systems which are expensive and are far from satisfying the requirements which a cement mortar modified with epoxy resin has to meet. EP 2 537 897 discloses the use of a polymer powder composed of epoxy resin, a vinyl ester polymer and a surfactant in cement-based mixtures without use of a hardener for the epoxy resin.

EP 2 537 896 describes a water-redispersible polymer powder which contains a heat-curable epoxy resin, a colloidal stabilizer and an interfacial crosslinker. Epoxy resin systems which are free of amine hardener either require elevated temperatures, which can be achieved only with great difficulty on building sites, for curing the epoxy resin or they cure only very slowly and/or insufficiently, as a result of which the demanding requirements which an epoxy resin-modified cement mortar has to meet are likewise not satisfied.

For this reason, there is a continuing need for a high-quality epoxy resin-modified mortar having good storage stability and simplified handling.

BRIEF DESCRIPTION OF THE INVENTION

It is therefore an object of the present invention to provide a storage-stable, one-component mortar composition which contains compounds having epoxide groups and after mixing with water has good processing properties and final properties.

This object is surprisingly achieved by a composition as described in claim 1. The composition is a one-component composition, i.e. it is storage-stable when appropriately stored and then only has to be mixed with water, which is particularly advantageous compared to the three-component epoxy resin-modified mortars according to the prior art. Lower costs are incurred for logistics, storage and transport, processing is simpler, quicker and less susceptible to errors and far less waste arises on the building site. Incorrect metering of the components, especially when only part of the previously metered packaged material is used, is ruled out in the case of the one-component composition.

The composition is surprisingly very storage-stable, even though epoxide groups and amine hardeners are present together in one component. The presence of the polymer P surprisingly increases the storage stability of the composition. The compositions according to the invention make particularly good adhesion properties and strengths, high water impermeability, particularly quick coatability and good chemical resistances possible.

Further aspects of the invention are subject matter of further independent claims. Particularly preferred embodiments of the invention are subject matter of the dependent claims.

Ways of Carrying out the Invention

The invention provides a composition comprising
at least one cement,
at least one inorganic filler,
at least one powder comprising at least one polymer P,
at least one compound containing epoxide groups,
where the at least one compound containing epoxide groups is identical to or different from the polymer P, and
at least one amine having at least three amine hydrogens which are reactive toward epoxide groups.

The composition contains more than 10% by weight of cement and at room temperature is present as storage-stable free-flowing powder and/or granular material.

A composition is referred to as "storage-stable" when it remains usable without restrictions when employed as intended after storage for a period of at least one month, preferably from at least three to six months and longer, in a suitable container.

In the present document, "room temperature" is a temperature of 21° C.

In the present document, a "redispersible polymer powder" is a powder which contains a polymer and after introduction into water forms a stable dispersion. The term "redispersible polymer powder" encompasses not only the polymer itself but also a mixture thereof with protective colloids, emulsifiers and support material.

As cement, it is possible to use any available type of cement or a mixture of two or more types of cement, for example the cements classified under DIN EN 197-1: Portland cement (CEM I), Portland composite cement (CEM II), blast furnace slag cement (CEM III), pozzolanic cement (CEM IV) and composite cement (CEM V). Of course, cements which are produced according to an alternative standard, for example the ASTM standard or the Indian standard, are equally suitable.

Particular preference is given to a cement in accordance with European standard EN 197-1, a calcium sulfoaluminate cement, a calcium aluminate cement or mixtures thereof, optionally in a mixture with calcium sulfate.

Portland cement or a cement containing Portland cement in accordance with EN 197-1 is most preferred. Portland cement is particularly readily available and makes mortars having good properties possible.

Mixtures of cement, calcium aluminate cement and calcium sulfate or of cement and calcium sulfoaluminate cement are especially suitable. Such binder mixtures make short setting times and high early strengths possible.

The composition is preferably free of latent hydraulic binders since the reaction with water and thus the strength development of these binders proceeds only very slowly.

The proportion of cement in the composition is more than 10% by weight, preferably more than 15% by weight, particularly preferably more than 18% by weight, based on 100% by weight of the dry composition.

The composition particularly preferably contains from 11 to 45% by weight, more preferably from 15 to 40% by weight, most preferably from 18 to 40% by weight, of cement.

Such an amount of cement makes a particularly high strength of the cured composition possible.

The composition contains at least one inorganic filler in addition to cement. Fillers are chemically inert, solid, particulate materials and are offered in various shapes, sizes and as different materials. They can vary from fine sand particles to large coarse stones. Particularly suitable fillers are sand, gravel, crushed stones, calcined pebbles or lightweight fillers, in particular clay, pumice, perlite or vermiculite. Further suitable fillers are aluminum oxide, calcium carbonate, fibers or amorphous silicon dioxide (fumed silica). The filler preferably comprises sand, in particular silica sand. This makes particularly good processability of the composition and an attractive, even surface after curing possible.

The particle size of the fillers is preferably less than 5 mm. In particular, the fillers have a particle size in the range from 0.1 μm to 3.5 mm, with sand, in particular silica sand, being particularly preferred. The particle size can be determined by means of sieve analysis. The optimum particle size depends on the use.

The proportion of inorganic filler in the composition is preferably 40% by weight or more, more preferably from 40 to 85% by weight, based on 100% by weight of the dry composition.

The composition additionally contains at least one powder comprising at least one polymer P. The polymer P is typically solid at room temperature. The powder containing the polymer P is preferably a water-redispersible polymer powder. Such a powder is preferably obtained by drying, in particular by spray drying, an aqueous dispersion containing at least one polymer P. The polymer P is preferably an organic polymer prepared by free-radical polymerization in water. The polymerization typically occurs as a dispersion polymerization in the presence of emulsifiers and/or water-soluble protective colloids, in particular polyvinyl alcohol.

If the free-radical polymerization for preparing the polymer P is carried out in the presence of protective colloids and/or emulsifiers, the polymer dispersion obtained and the powder obtained therefrom by drying likewise contain these protective colloids and/or emulsifiers.

Here, the protective colloids and/or emulsifiers can improve the redispersion properties of the powder.

The polymer P preferably contains styrene, ethylene, butadiene, acrylic ester, vinyl chloride, vinylidene chloride or vinyl acetate as monomer building blocks. A polymer P, which comprises a copolymer containing the monomer building blocks styrene and acrylic ester, in particular styrene and butyl acrylate, is particularly suitable.

The polymer P preferably has a minimum film formation temperature (MFT) of 25° C. or less, more preferably less than 19° C. When such polymers are present as dispersion, they form films by coagulation at or below the MFT. This film formation occurs particularly when the dispersion dries out. A low MFT is advantageous, particularly in the case of relatively cool temperatures.

The composition preferably contains from 0.5 to 20, more preferably from 2.5 to 18, even more preferably from 3.2 to 15, percent by weight of polymer P, based on 100% by weight of the dry composition.

In a preferred embodiment, an inert inorganic support material and/or protective colloids is/are added to the dispersion containing the polymer P before, during or after spray drying. The flowability of the powder and/or the redispersibility of the powder can be improved in this way.

For the present purposes, an "inorganic support material" is a fine inorganic powder. This can be mixed with relatively soft or liquid constituents in order to obtain a free-flowing powder.

The inorganic support material is preferably a fine powder having a specific surface area of from 0.1 to 500 m$^2$/g and/or having a particle size in the range from 10 nm to 10 μm. The inorganic support material is preferably inert, i.e. it does not react with the materials to which it is added. Such powders are preferably Ca or Mg carbonate, dolomite, quartz flour, amorphous silicon dioxide, pumice, titanium dioxide, aluminum silicate, talc, mica, kieselguhr, gypsum, alumina, kaolins, metakaolins, magnesite, ground shale, ground rock or mixtures thereof. Special preference is given to calcium carbonate, dolomite, amorphous silicon dioxide, clay or mixtures thereof.

Preferred protective colloids are, in particular, partially hydrolyzed or fully hydrolyzed polyvinyl alcohols, polyvinylpyrrolidones, polyvinyl acetals, polysaccharides in water-soluble form, e.g. carboxymethyl cellulose, methyl cellulose, hydroxyethyl cellulose, hydroxypropyl cellulose, proteins such as casein or caseinate, soybean protein or gelatin. Particular preference is given to partially hydrolyzed polyvinyl alcohols having a degree of hydrolysis in the range from 80 to 95 mol %.

In a preferred embodiment, the compound containing epoxide groups is identical to the polymer P and is a copolymer having covalently bound epoxide groups.

Such a polymer can be prepared by free-radical polymerization of at least one monomer which bears epoxide groups. Such a monomer is preferably selected from the group consisting of glycidyl acrylate, glycidyl methacrylate, allyl glycidyl ether and mixtures thereof.

The polymer preferably contains further monomers, in particular selected from amongst styrene, ethylene, butadiene, acrylic esters, vinyl chloride, vinylidene chloride, vinyl acetate and mixtures thereof, in addition to the monomer bearing epoxide groups.

The polymer containing covalently bound epoxide groups is especially preferably able to be prepared by free-radical copolymerization of styrene, alkyl acrylate, in particular butyl acrylate, and glycidyl methacrylate.

The polymer P having covalently bound epoxide groups is preferably prepared by free-radical dispersion polymerization in water, optionally in the presence of emulsifiers and/or water-soluble protective colloids. The polymer dispersion obtained in this way is preferably spray dried in order to obtain the powder comprising the polymer P. An inert inorganic support material and/or protective colloids can optionally be added before, during or after spray drying. The polymer P having covalently bound epoxide groups preferably has an epoxide value in the range from 0.5 to 3.0, more preferably from 0.8 to 2.5, particularly preferably from 1.0 to 2.0, mmol of epoxide groups per g of polymer P.

The polymer P having covalently bound epoxide groups is preferably present as water-redispersible powder and has a minimum film formation temperature (MFT) of ≤25° C., more preferably ≤19° C.

Such a polymer which has film-forming properties and covalently bound epoxide groups can be cured surprisingly well by means of conventional amine hardeners and can improve the durability, in particular the strength and chemical resistance, and the water impermeability of mortars.

In a further preferred embodiment, the compound containing epoxide groups is not identical to the polymer P and is an epoxy resin.

Any epoxy resin is suitable as long as it can be emulsified or dispersed in water and can react with conventional amine hardeners at ambient temperatures, in particular at temperatures in the range from 5 to 35° C.

The epoxy resin is preferably a liquid epoxy resin.

Preference is given to an epoxy resin having a glass transition temperature of 25° C.

Particular preference is given to epoxy resins based on bisphenol A diglycidyl ether or bisphenol F diglycidyl ether or bisphenol A/F diglycidyl ether. The epoxy resin can additionally contain at least one reactive diluent, in particular glycidyl ethers of monohydroxyphenols or polyhydroxyphenols or aliphatic or cycloaliphatic alcohols.

The epoxy resin can additionally contain emulsifiers, in particular nonionic emulsifiers. This improves the emulsifiability in the processing of the composition.

The composition preferably contains from 0.1 to 7, more preferably from 0.5 to 5, particularly preferably from 0.7 to 2.5, percent by weight of epoxy resin, based on 100% by weight of the dry composition.

It has surprisingly been found that the epoxy resin can be introduced in a migration-resistant and storage-stable manner into the composition by means of the combination of epoxy resin with a polymer P.

The epoxy resin is preferably present in an intimate mixture with the polymer P. This mixture preferably additionally contains inorganic support material and/or water-soluble protective colloid.

The polymer P preferably does not contain any covalently bound epoxide groups when it is present in a mixture with an epoxy resin. Preference is given to this polymer P being present as powder and being redispersible in water and having a minimum film formation temperature (MFT) of ≤25° C. or below, more preferably ≤19° C.

Such mixtures can be dispersed readily on contact with water. Here, the polymer P surprisingly leads to a particularly good storage stability of the composition and makes particularly good adhesion properties and strengths, a particularly quick coatability, a high water impermeability and particularly high chemical resistances possible.

The weight ratio of epoxy resin to polymer P is preferably in the range from 1:1 to 1:10, particularly preferably from 1:3 to 1:8.

The mixture of epoxy resin and polymer P preferably has an epoxide value in the range from 0.5 to 3.0, more preferably from 0.8 to 2.5, particularly preferably from 0.8 to 1.5, mmol of epoxide groups per g of polymer P. Such a mixture represents, in particular, a redispersible powder and is preferably present in an amount of from 0.6 to 20, more preferably from 4 to 16, percent by weight in the composition, based on 100% by weight of the dry composition.

The intimate mixture of epoxy resin and polymer P can be produced by mixing the powder comprising a polymer P with the epoxy resin, optionally together with support material and/or a protective colloid, in suitable mixers.

The intimate mixture of epoxy resin and polymer P is preferably obtained by an aqueous dispersion containing the polymer P being mixed with the epoxy resin and then being spray dried. Such a mixture is particularly storage-stable. Inert inorganic support material and/or protective colloids can optionally be mixed in before, during or after spray drying.

An inorganic support material is preferably present in amounts of up to 50 parts by weight, more preferably up to 30 parts by weight, even more preferably up to 20 parts by weight, based on 100 parts by weight of the water-free mixture of epoxy resin and polymer P.

In such an amount, the inorganic support material brings about an especially good storage stability of the composition.

A premix containing the epoxy resin and the powder comprising a polymer P is advantageously prepared before this is added to the composition.

This premix is preferably free of compounds which can react as hardener with the epoxy resin.

Mixtures produced in this way can be dispersed particularly readily in water and are particularly storage-stable, without forming lumps, in the composition. The amine having at least three amine hydrogens which are reactive toward epoxy groups acts as hardener for epoxide group-containing compounds in the composition after mixing of the composition with water.

The term amine hydrogens refers to hydrogen atoms which are bound directly to an amine nitrogen atom and can react with epoxide groups. The at least three active amine hydrogens are preferably present as free amines, in particular they are not present as salts of an organic or inorganic acid. Salts of amines liberate the acid as soon as the cement-containing composition is mixed with water. This can lead to undesirable secondary effects, for example poor processability or delaying of setting.

The amine having at least three amine hydrogens which are reactive toward epoxide groups is preferably a water-dilutable amine or a constituent of a water-dilutable amine mixture.

A suitable water-dilutable amine mixture comprises, in particular, a mixture of (i) diamines or polyamines, (ii) polyalkylenamines and (iii) amine-functionalized adducts of amines with epoxides.

The term "water-dilutable" means that a liquid forms a homogeneous mixture without phase separation when it is mixed with water.

The composition preferably contains a water-dilutable amine mixture which comprises at least one amine-epoxide adduct having at least three amine hydrogens.

The composition preferably contains from 0.05 to 6% by weight, more preferably from 0.3 to 4% by weight, most preferably from 0.5 to 3.5% by weight, of amine, based on 100% by weight of the dry composition.

A particularly preferred water-dilutable amine mixture contains
  at least one amine-epoxide adduct of the formula (I),
  at least one amine-epoxide adduct of the formula (II),
  at least one amine-epoxide adduct of the formula (III) and
  at least one amine which has two primary amino groups and is free of further amino groups and ether groups, The amine or the amine mixture can be introduced directly into the composition by spraying-on or mixing-in.

In a preferred embodiment, the amine is applied to an inorganic support material. The support material is preferably a fine inorganic powder, as described above, in particular a silicate, silicon dioxide or a mixture thereof. The amine or the amine mixture can be applied in any way to the support material, in particular by spraying-on or mixing.

The amine or the amine mixture can, in particular, be brought into contact in concentrated solution in water or a solvent with the support material and the mixture can subsequently be completely or partially dried.

After application to the support material, the amine or the amine mixture is, in particular, present as powder and is thus particularly suitable for being mixed into the composition.

The mixture of amine and support material is preferably brought into contact with a liquid or viscous, hydrophobic polymer. It is also possible for a mixture of the amine with the hydrophobic polymer to be applied to the support material. This polymer preferably has a low molecular weight. Preferred polymers are homopolymers or copolymers of polybutadiene or a styrene-butadiene-styrene block copolymer. The greatest preference is given to a liquid homopolymer or copolymer of butadiene.

The amine hardener for the epoxide compound remains surprisingly stable in the composition and has only a mini-

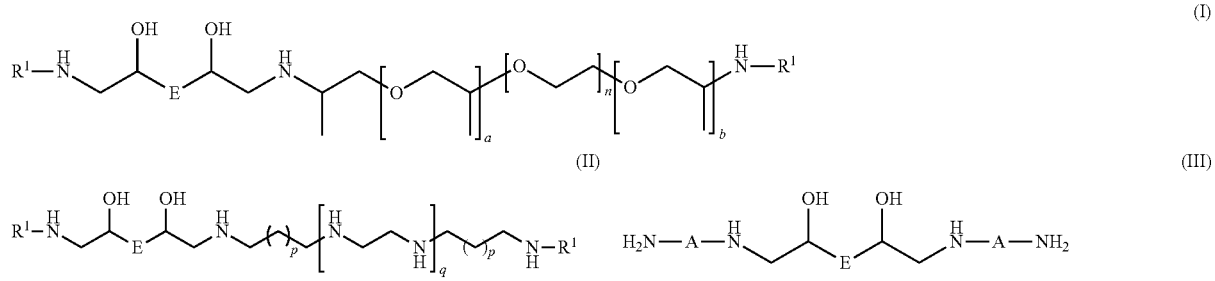

where
  a is an integer from 0 to 10, b is an integer from 1 to 10, n is an integer
  from 5 to 50 and the sum (a+b) is an integer from 1 to 10,
  p is 0 or 1 and q is 0, 1, 2 or 3,
  E is the radical of a diepoxide after removal of the two epoxide groups,
  $R^1$ is a monovalent organic radical having a molecular weight in the range from 15 to 150 g/mol, in particular pent-3-en-2-on-4-yl or hex-4-en-2-on-5-yl or benzyl,
  $R^2$ is the monovalent organic radical having a molecular weight in the range from 100 to 280 g/mol, in particular octyl, 2-ethylhexyl, nonyl, decyl,
  $C_{12}$ to $C_{18}$-alkyl or $C_{12}$ to $C_{18}$-alkylaminopropyl, and
  A is a divalent organic radical having a molecular weight in the range from 28 to 500 g/mol, in particular a polyoxypropylene radical having a molecular weight in the range from 180 to 500 g/mol.

Such a water-dilutable amine mixture is especially suitable for the curing of a composition comprising cement, inorganic fillers, powder comprising at least one polymer P and at least one compound containing epoxide groups, after mixing with water.

mal odor of amine when it has been applied to an inert support material and treated with a hydrophobic polymer.

In a preferred embodiment, the amine is premixed with support material and optionally the hydrophobic polymer before being added to the composition.

Such a premix is preferably a storage-stable powder. This powder preferably contains from 20 to 80, more preferably from 30 to 40, percent by weight of inorganic support material, based on 100% by weight of the premix. Special preference is given to a premix comprising from 20 to 80, preferably from 30 to 40, percent by weight of amines, from 0 to 50, preferably from 30 to 40, percent by weight of hydrophobic polymer, in particular liquid polybutadiene, and from 20 to 80, preferably from 30 to 40, percent by weight of support material, in particular amorphous silicon dioxide, based on 100% by weight of the premix.

Such a premix preferably has an amine number of from 100 to 500 mg KOH/g.

The ratio of epoxide groups to reactive amine hydrogens in the composition is preferably in the range from 1.5:1 to 1:1.5. Such a ratio makes good curing of the epoxy resin by means of the amine hardener possible.

The composition can contain still further additives. In particular, substances for reducing the shrinkage can be added. Particularly suitable substances for reducing the shrinkage are calcium sulfoaluminates and/or neopentyl glycol. Further optional constituents are plasticizers, thickeners, thixotropes, emulsifiers, antifoams, air pore formers, fibers, chromate reducers, dyes, pigments, water retention agents, hydrophobicizing agents, floatation agents, accelerators and/or retarders. Apart from these additives, all other additives known in mortar and concrete technology are possible additions.

In a preferred embodiment, the composition contains
from 11 to 45% by weight of cement,
from 40 to 85% by weight of inorganic fillers,
from 0.5 to 20% by weight of powder comprising at least one polymer P,
from 0.1 to 7% by weight of epoxy resin,
from 0.05 to 6% by weight of amine and
from 0 to 10% by weight of further additives,
based on 100% by weight of the dry composition.

In a particularly preferred embodiment, the composition contains
from 18 to 40% by weight of cement,
from 40 to 85% by weight of inorganic fillers,
from 2.5 to 18% by weight of powder comprising at least one polymer P,
from 0.8 to 5% by weight of epoxy resin,
from 0.5 to 3.5% by weight of amine and
from 1 to 10% by weight of additives selected from the group consisting of plasticizers, shrinkage reducers, chromate reducers, pigments, antifoams, accelerators, thickeners, protective colloids and emulsifiers, based on 100% by weight of the dry composition.

In a further preferred embodiment, the composition contains
from 11 to 45% by weight of cement,
from 40 to 85% by weight of inorganic fillers,
from 0.5 to 20% by weight of powder comprising at least one polymer P, with
the polymer P containing covalently bound epoxide groups,
from 0.05 to 6% by weight of amine and
from 0 to 10% by weight of additives,
based on 100% by weight of the dry composition.

An inorganic support material which may optionally be present and has been introduced together with the amine and/or the powder comprising a polymer P into the composition is counted as an inorganic filler.

The composition is a storage-stable free-flowing powder and/or granular material at room temperature.

The composition is preferably produced by mixing the individual components in a dry mixer.

Preference is given to preparing separate pulverulent premixes.

Particular preference is given to a first premix containing the compound containing epoxide groups and a second premix containing the amine being produced separately. These premixes are preferably mixed separately from one another with the other constituents of the composition.

A preferred premix contains a powder which comprises a polymer P having covalently bound epoxide groups and optionally also support material and/or protective colloids.

A further preferred premix contains a powder comprising a polymer P, an epoxy resin and optionally an inorganic support material and/or protective colloid.

Such a premix is particularly preferably provided by spray drying an aqueous dispersion comprising the polymer P having covalently bound epoxide groups or by spray drying an aqueous dispersion comprising the polymer P and an epoxy resin.

A premix which contains the amine preferably additionally comprises an inorganic support material to which the amine has been applied and optionally a hydrophobic polymer as described above.

Preference is given to a process for producing the composition which comprises the steps
a) provision of a premix by spray drying an aqueous dispersion comprising
at least one polymer P and
at least one compound containing epoxide groups,
where the at least one compound containing epoxide groups is identical to or different from the polymer P,
b) provision of an amine-containing powder by applying at least one amine having at least three amine hydrogens which are reactive toward epoxide groups, optionally in the form of a water-dilutable amine mixture, to a pulverulent, inorganic support material,
c) mixing of the powder containing epoxide groups and the amine-containing powder with the further constituents of the composition.

In addition, the amine-containing powder can be mixed with a hydrophobic polymer.

Preference is given to inorganic fillers, cement and further additives which are optionally present firstly being premixed and the premix containing epoxide groups from step a) and the amine-containing powder from step b) being mixed in separately from one another in any order.

The aqueous dispersion comprising the polymer P and an epoxy resin is preferably obtained by mixing an aqueous dispersion containing the polymer P with at least one epoxy resin.

Surprisingly, such compositions have good storage stability. This means that the powders have unchanged properties in the composition even after prolonged storage. Preference is given to a composition which after storage at 21° C. for one month, preferably 3 months, even more preferably 6 months, after mixing with water has comparable processing properties and final properties to those of the composition freshly after it has been produced. Greatest preference is given to a composition which satisfies this requirement after storage at 35° C. for one month, preferably after 3 months.

A preferred container for storage of the composition is a sack, in particular a paper sack with an inner lining of polymer film, with a composition packed in paper or paperboard having to be protected against liquid water, in particular protected against rain, during storage.

For processing, the composition according to the invention is mixed with water. Preference is given to an amount of water which corresponds to a W/C (weight ratio of water and cement) of from 0.30 to 0.50, preferably from 0.35 to 0.45.

The invention further provides a polymer-modified mortar comprising the composition and water.

After mixing with water, the constituents of the composition cure to form a solid. In the curing of the composition, the cement reacts with the water in a complex reaction to form cement hydrates, the compound having epoxide groups reacts with the amine to form an at least partially crosslinked polymer and the particles of the polymer P form an at least partially contiguous polymer film. The combination of cement, epoxy compound, amine and polymer gives a polymer-modified mortar having good final properties, in particular a high strength, a high water impermeability, high chemical resistance, good adhesion and quick coatability.

Surprisingly, the composition of the invention after mixing with water and curing has similarly good processing properties and final properties as a three-component comparative composition according to the prior art.

The polymer-modified mortar is preferably used as masonry mortar, render mortar, repair mortar, patching mortar, troweling composition, screed, coating, anti corrosion coating or self-leveling floor leveling composition for a subsequent floor covering.

The mortar produced by mixing the composition with water is readily processable and when applied to a substrate, for example concrete, has good compressive strength and adhesion properties. The compressive strength is advantageously more than 10 MPa after curing for 24 hours at 21° C. and 65% relative atmospheric humidity. This allows loading of the coating, for example by walking, without damaging the coating.

The adhesive strength is advantageously more than 2 MPa, preferably more than 2.5 MPa, after 7 days measured in accordance with EN 1542 after storage at 21° C. and 65% relative atmospheric humidity.

After mixing with water and application to a substrate, for example concrete, the composition quickly, preferably after not more than 24 hours, more preferably 21 hours, attains a surface moisture content of less than 4% by weight of water. The delay time until application of a covering layer, for example sealing with a coating based on epoxy resin or polyurethane, can be significantly reduced thereby. This sealing layer or coating adheres very well to the applied mortar.

Preference is therefore given to a polymer-modified mortar which, when applied in a layer thickness in the range of 1.5 to 3 mm to dry concrete and subsequently deaerated by means of a spiked roller and subsequently being stored at 21° C. and 65% relative atmospheric humidity, attains a surface moisture content of less than 4% by weight of water, measured using a Tramex CME4 screed moisture measuring instrument as average of 6 measurements, after not more than 24 hours, preferably after not more than 21 hours. Such a surface is particularly suitable for further coating with a coating based on epoxy resin or polyurethane.

Preference is given to a polymer-modified mortar which, after application to a dry concrete as described above and after curing for 24 hours at 21° C. and 65% relative atmospheric humidity, is coated with a coating based on epoxy resin or polyurethane and this has an adhesive bond strength of more than 1.5 MPa, preferably more than 2 MPa, after storage for 14 days at 21° C. and 65% relative atmospheric humidity.

The composition can, after mixing with water, be used in a process for coating, renovation or protection of construction elements with a one-component composition according to the invention as described above, wherein the process comprises the following process steps a) mixing of the composition with water
b) processing of the resulting mixture by
  b1) application of the mixture to the surface of one or more construction elements to effect coating,
  b2) introduction of the mixture into hollow spaces or unevennesses of a construction element for the purpose of filling or smoothing,
  b3) application of the mixture as corrosion protection to reinforcing steel of a construction element,
c) optionally smoothing and/or deaeration of the applied or introduced mixture and
d) curing of the mixture.

The processing of the mixture and curing can, in particular, be carried out at temperatures in the range from 5 to 35° C.

The construction element for coating can be a substrate made of any material, in particular the materials customary for building work, for example concrete, stone, masonry, render, glass or metal.

The construction element is preferably a floor, for example one made of concrete, mortar, screed or stones, with the coating composed of the composition according to the invention forming a floor covering. This is particularly preferably a self-leveling floor covering. The floor can be provided with a primer. Furthermore, it is possible to apply a covering layer as seal to the applied cured mixture.

To introduce the mixture into the hollow spaces or unevennesses to be filled of construction elements, the one-component composition of the invention can be used in a conventional way, for example as mortar or repair mortar.

As corrosion protection, the one-component composition of the invention can be applied in a conventional way, for example by brushing on or spraying onto the reinforcement.

The invention further provides for the use of a water-dilutable amine mixture containing
  at least one amine-epoxide adduct of the formula (I),
  at least one amine-epoxide adduct of the formula (II),
  at least one amine-epoxide adduct of the formula (III) and
  at least one amine which has two primary amino groups and is free of further amino groups and ether groups,

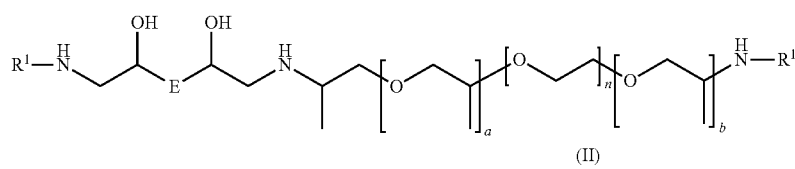

(I)

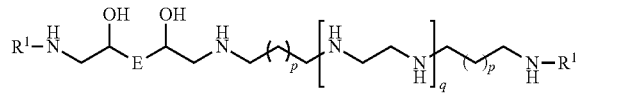

(II)

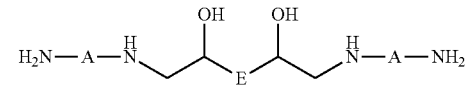

(III)

where
  a is an integer from 0 to 10, b is an integer from 1 to 10, n is an integer from 5 to 50 and the sum (a+b) is an integer from 1 to 10,
  p is 0 or 1 and q is 0, 1, 2 or 3,
  E is the radical of a diepoxide after removal of the two epoxide groups,
  $R^1$ is a monovalent organic radical having a molecular weight in the range from 15 to 150 g/mol, in particular pent-3-en-2-on-4-yl or hex-4-en-2-on-5-yl or benzyl, $R^2$ is a monovalent organic radical having a molecular weight in the range from 100 to 280 g/mol, in particular octyl, 2-ethylhexyl, nonyl, decyl, $C_{12}$ to $C_{18}$-alkyl or $C_{12}$ to $C_{18}$-alkylaminopropyl, and A is a divalent organic radical having a molecular weight in the range from 28 to 500 g/mol, in particular a polyoxypropylene radical having a molecular weight in the range from 180 to 500 g/mol, as constituent of a pulverulent or granular composition comprising cement, inorganic fillers and a powder comprising at least one polymer P and at least one compound containing epoxide groups.

Such a composition cures after mixing with water, as described above.

EXAMPLES

Working examples which are intended to illustrate the invention described are set forth below. It goes without saying that the invention is not restricted to these working examples described.

1. Description of the Measurement Methods

The adhesive strength of the test mortar was determined in accordance with EN 1542 after application and curing of the test mortar on a sand-blasted garden slab made of concrete.

The adhesive strength of a coating based on epoxy resin or polyurethane on the test mortar was determined in accordance with EN 1542.

The surface moisture content of a coating having a thickness of from 1.5 to 3 mm applied to a sand-blasted garden slab made of concrete was determined by means of a TRAMEX CME4 screed moisture measuring instrument (Tramex Ltd. (de), Germany). Here, the moisture content is determined by means of an electronic impedance measurement. Measurements were carried out at six different points on the applied coating at regular intervals. The average of the six measurements was determined as moisture content. The time between application of the coating and attainment of a moisture content of less than 4% by weight of water was determined in this way.

2. Materials Used

A premix A1 consisting of 14% by weight of bisphenol F diglycidyl ether, 71% by weight of redispersible powder based on a styrene-acrylate copolymer and 15% by weight of support material composed of calcium carbonate and silicate was provided in the form of a free-flowing powder having an epoxide value of 0.86 mmol/g.

A premix B1 consisting of amine, a polybutadiene and about 34% by weight of fumed silica was provided in the form of a free-flowing powder having an amine number of 220 mg KOH.

A premix C1 consisting of 62.5% by weight of silica sand having particle sizes in the range from 0.1 to 2.2 mm, 34% by weight of Portland cement CEM I 52.5, 2.0% by weight of calcium carbonate and 1.5% by weight of a mixture of plasticizer, antifoam, shrinkage reducer and chromate reducer was provided.

As reference, use was made of Sikafloor®-81 EpoCem®, an epoxy resin-modified three-component flow screed based on cement and consisting of an aqueous, epoxy resin-containing binder component, an aqueous amine-containing hardener component and a powder mixture.

3. Production of the Compositions According to the Invention and the Comparative Mixture Composition Z1

40 g of the premix A1 and 10 g of the premix B1 were, in succession, mixed well into 1 kg of the premix C1.

Composition Z2

80 g of the premix A1 and 20 g of the premix B1 were, in succession, mixed well into 1 kg of the premix C1.

Composition Z3

160 g of the premix A1 and 40 g of the premix B1 were, in succession, mixed well into 1 kg of the premix C1.

Comparative Mixture V1

36.5 g of a mixture of bisphenol A/F diglycidyl ether, alkyl glycidyl ether and a dispersant which had been heated to 40° C. were sprayed onto 1 kg of the premix C1 and mixed in well, giving a free-flowing powder.

4. Storage Stability

Samples of the composition Z2 and of the comparative mixture V1 were stored for one month at 21° C. and 65% relative atmospheric humidity and at 35° C. and 65% relative atmospheric humidity in tightly closed plastic buckets.

After storage for one month, 5 kg of the composition Z2 were mixed with 800 g of water for 3 minutes in a Hobart mixer.

The two mortars, the one produced from the composition Z2 stored at 21° C. as well as the one produced from the composition Z2 stored at 35° C., could be processed very readily and without problems.

The comparative mixture V1 was likewise tested after storage. For this purpose, 5 kg of the comparative mixture V1 were in each case mixed with 735 g of the aqueous amine-containing hardener component Sikafloor®-81 EpoCem® and 112.5 g of water for three minutes in a Hobart mixer.

The mortar produced from the comparative mixture V1 which had been stored for one month at 21° C. could be processed without problems.

The mortar produced from the comparative mixture V1 which had been stored for one month at 35° C. could no longer be processed correctly because of its viscous and sticky consistency.

5. Use of the Compositions and Production of the Mortars 5000 g of the compositions Z1, Z2 and Z3 according to the invention and of the premix C1 were in each case mixed with 800 g of water for 3 minutes in a Hobart mixer.

Sikafloor®-81 EpoCem® was used for the reference mixture 1. The binder component containing epoxy resin and the amine-containing hardener component were mixed with one another in the mixing vessel of a Hobart mixer. The pulverulent component was subsequently added while stirring and the mixture was mixed for a further 3 minutes until a homogeneous mixture had been formed.

A sand-blasted garden slab made of concrete was coated with the mortars in a layer thickness of from 1.5 to 3 mm and the fresh coating was deaerated by means of a spiked roller. The coated garden slab was stored at 21° C. and 65% relative atmospheric humidity. Starting 10 hours after application of the coating, the surface moisture content was measured every hour. The adhesive strength of the coating was determined after 2 days and after 28 days. The properties of the fresh mortar and the coatings are reported in table 1.

TABLE 1

|  | Reference example 1 | Example 1 | Example 2 |
|---|---|---|---|
| Mortar basis | Sikafloor ®-81 EpoCem ® | Composition Z1 | Composition Z2 |
| Processability | Very good | Very good | Very good |
| Attainment of the surface moisture content of <4% [h] | 21 | 17 | 19 |
| Adhesive strength after 7 days [MPa] | 3.0 | 3.4 | 2.8 |
| Adhesive strength after 28 days [MPa] | 3.6 | 3.8 | 3.2 | n.m.: not measured

6. Adhesion of a Sealing Layer on the Mortar Coating

A sand-blasted dry garden slab made of concrete was coated with the fresh mortars in a layer thickness of from 1.5 to 3 mm, the fresh coating was deaerated by means of a spiked roller and the coated garden slab was stored for 24 hours at 21° C. and 65% relative atmospheric humidity. Sikafloor® 160 EP (epoxy resin coating, from Sika), or Sikafloor® 359 PU (polyurethane coating, from Sika), was subsequently applied as coating. After storage for 14 days at 21° C. and 65% relative atmospheric humidity, the adhesion of the applied coating to the mortar substrate was determined. The results are reported in table 2 and table 3.

TABLE 2

Adhesive strength of Sikafloor ® 160 EP after 14 days.

|  | Reference example 2 | Reference example 3 | Example 3 | Example 4 |
|---|---|---|---|---|
| Mortar basis | 3-component system | Premix C1 | Composition Z2 | Composition Z3 |
| Adhesive strength [MPa] | 3.6 | No adhesion | 2.2 | 3.1 |

TABLE 3

Adhesive strength of Sikafloor ® 359 PU after 14 days

|  | Reference example 4 | Reference example 5 | Example 5 | Example 6 |
|---|---|---|---|---|
| Mortar basis | 3-component system | Premix C1 | Composition Z2 | Composition Z3 |
| Adhesive strength [MPa] | 3.1 | No adhesion | 2.8 | 3.0 |

The invention claimed is:

1. A composition comprising
   at least one cement,
   at least one inorganic filler,
   at least one powder comprising at least one polymer P, the polymer P having covalently bound epoxy groups and having an epoxide value in a range from 0.8 to 3.0 mmol of epoxide groups per g of polymer P,
   at least one compound containing epoxide groups, where the at least one compound containing epoxide groups is identical to or different from the polymer P, and
   at least one amine having at least three amine hydrogens which are reactive toward epoxide groups, wherein the composition contains more than 10% by weight of cement and at room temperature is present as storage-stable free-flowing powder and/or granular material, and
   the compound containing epoxide groups is identical to the polymer P and is a copolymer having covalently bound epoxide groups.

2. The composition as claimed in claim 1, wherein the polymer P comprises a copolymer containing the monomer building blocks styrene and acrylic ester.

3. The composition as claimed in claim 1, wherein it contains from 0.5 to 20, percent by weight of polymer P.

4. The composition as claimed in claim 1, wherein the amine having at least three amine hydrogens which are reactive toward epoxide groups is a water-dilutable amine or a constituent of a water-dilutable amine mixture.

5. The composition as claimed in claim 4, wherein it contains a water-dilutable amine mixture which comprises at least one amine-epoxide adduct having at least three amine hydrogens.

6. The composition as claimed in claim 1, wherein the amine has been applied to an inorganic support material.

7. A process for producing the composition as claimed in claim 1, comprising the steps
   a) provision of a premix by spray drying an aqueous dispersion comprising
      at least one polymer P and
      at least one compound containing epoxide groups, where the at least one compound containing epoxide groups is identical to the polymer P,
   b) provision of an amine-containing powder by applying at least one amine having at least three amine hydrogens which are reactive toward epoxide groups, optionally in the form of a water-dilutable amine mixture, to a pulverulent, inorganic support material,
   c) mixing of the powder containing epoxide groups and the amine-containing powder with the further constituents of the composition.

8. A composition comprising:
   from 11 to 45% by weight of at least one cement,
   from 40 to 85% by weight of at least one inorganic filler,
   from 0.5 to 20% by weight of at least one powder comprising at least one polymer P, the polymer P having covalently bound epoxy groups and having an epoxide value in a range from 0.8 to 3.0 mmol of epoxide groups per g of polymer P,
   from 0.05 to 6% by weight of at least one amine having at least three amine hydrogens which are reactive toward epoxide groups, and
   from 0 to 10% by weight of further additives, based on 100% by weight of the dry composition,
   wherein the composition at room temperature is present as storage-stable free-flowing powder and/or granular material.

* * * * *